United States Patent [19]

Fawcett

[11] Patent Number: 5,719,562
[45] Date of Patent: Feb. 17, 1998

[54] PAGING SYSTEM USING COMPACT HIERARCHICAL ADDRESSING

[75] Inventor: Glenn S. Fawcett, Vancouver, Canada

[73] Assignee: Glenayre Electronics, Inc. (a Colorado corporation), Charlotte, N.C.

[21] Appl. No.: 559,540

[22] Filed: Nov. 16, 1995

[51] Int. Cl.⁶ .................................................. H04Q 7/14
[52] U.S. Cl. .................... 340/825.44; 340/825.47; 340/825.52; 340/825.53; 455/38.2
[58] Field of Search ......................... 340/825.44, 825.47, 340/825.26, 825.27, 825.52, 825.53, 311.1; 370/313, 314, 346, 471, 474, 475, 476, 477; 455/38.2

[56] References Cited

U.S. PATENT DOCUMENTS

| | | | |
|---|---|---|---|
| 4,590,473 | 5/1986 | Burke et al. | 340/825.52 |
| 4,916,539 | 4/1990 | Galumbeck et al. | 340/825.47 X |
| 5,140,419 | 8/1992 | Galumbeck et al. | 340/825.44 X |
| 5,241,305 | 8/1993 | Fascenda et al. | 340/825.44 |
| 5,396,493 | 3/1995 | Sigiyama | 340/825.53 X |
| 5,461,627 | 10/1995 | Rypinski | 370/346 |

*Primary Examiner*—Edwin C. Holloway, III
*Attorney, Agent, or Firm*—Christensen O'Connor Johnson & Kindness PLLC

[57] ABSTRACT

An hierarchical addressing mechanism for use in a paging system is disclosed. The paging system assigns a compressed organization identifier to each of the organization identifiers for the organizations that are sharing the resources of the paging system. Each of the pagers within the paging system are provided with an associative table that associates the compressed organization identifiers with organization identifiers. In operation, the paging system forms a page by appending an address word to a message. The address word includes the compressed organization identifier determined from the associative table and the pager identifier for the called pager. In this manner, a more efficient method of addressing pagers is disclosed.

14 Claims, 4 Drawing Sheets

PAGING SYSTEM USING COMPACT HIERARCHICAL ADDRESSING

FIELD OF THE INVENTION

The present invention relates to paging systems, and more particularly, to a paging system that uses a hierarchical addressing system for its pagers.

BACKGROUND OF THE INVENTION

A paging system typically might support millions of pagers using a network of thousands of paging transmitters in fixed locations nationwide. The paging transmitters are also supported by a control system and at least one paging terminal. The paging terminal operates to supply the pages to be broadcast to each of the paging transmitters. The combination of paging transmitters, control systems, and paging terminals, is collectively known as the paging infrastructure of the paging system. For modem two-way paging systems where the pagers can send as well as receive information, the paging infrastructure will also have a large number of paging receivers in fixed locations. For a discussion of a one-way paging system, the reader is directed towards U.S. Pat. No. 5,365,569 to Witsaman et al., commonly assigned to the assignee herein.

In the prior art, each pager in the paging system is assigned a unique pager address. This address is also referred to as the CAP code. The CAP code allows each pager to identify those pages, amongst the millions that are transmitted, which are addressed to itself. The paging system, when transmitting a page, includes in the page a fixed length address word or CAP code.

If the address word is 32-bits long, up to 4,294,967,304 individual pagers may be addressed by each paging system ($2^{32}$). This would appear to be more than adequate for any paging application. However, many independent or semi-independent paging service providers may need to share the same paging infrastructure. Thus, two or more paging service providers will send their paging messages over the same paging infrastructure. This allows the paging service providers to share the high cost of the paging infrastructure equipment. The sharing of paging infrastructure equipment may also arise when there is a merger between two or more paging service providers and they are consolidated into a single organization.

In the case of two independent paging service providers using the same infrastructure, each organization will have its own set of customers, and thus must control and page its own set of pagers. In many cases, these organizations that share an infrastructure wish to minimize the information they provide to each other about their customers.

A hierarchical addressing scheme where a predetermined number of bits of the address word are reserved as an organizational identifier and the remaining bits are used as the individual CAP code identifier within that organization may be used. This is analogous to a telephone number that is divided into an area code and a local number. Once the organization identifiers are distributed among the paging service provider organizations, each organization is free to assign individual addresses as it pleases.

Nevertheless, paging service provider organizations often do not know in advance with which other organizations they will want to share an infrastructure. It is difficult to predict consolidations in advance. Therefore, it would be desirable to assign a unique organizational identifier to each organization in the paging industry. This would allow any two paging service providers to share paging infrastructure equipment at any later date. Currently, this may require over 1,000 distinct organizational identifiers.

This approach, while fundamentally simple, gives rise to a problem of lack of address word bit size. Taking the example of a 32-bit address word, it would require 10 bits of that address word to support 1,024 organizations. Thus, only 22 bits of the address word would be left for the individual paging identifier within the organization. A 22-bit identifier limits an organization to a maximum of 4,194,304 pagers ($2^{22}$), which is less than some large paging service providers currently service. Thus, the 32-bit address word is inadequate under this scheme.

One solution would be to use a larger address word. However, this would be an expensive solution. Pages to pagers are often quite short, therefore the address word makes up a large part of the page. A large address word reduces air time efficiency. Thus, for a paging system, most of the page would consist of the address word while very little of the page may consist of the actual message.

Another disadvantage of increasing the size of the address word is that it may reduce the battery life of the pager because many pagers are only active periodically and for only long enough to identify whether or not the address words being transmitted is their own. By increasing the length of the address word, the pager must analyze the pages being transmitted by the paging system for a relatively longer duty cycle. This would lower the battery life of the pager.

The size of the address word becomes even more important in systems utilizing two-way paging. The bit rate capacity of the radio channel from the pager to the paging infrastructure is often very limited and thus valuable. By minimizing the address word, valuable reverse channel resources are saved. The battery in the pager is also limited in capacity, necessitating the transmission of short signals of which the address word forms a large component.

SUMMARY OF THE INVENTION

The present invention discloses a method of addressing a pager in a paging system. The paging system includes a plurality of paging transmitters and at least one paging terminal. The paging transmitters, in response to direction from the paging terminal, transmit pages to various pagers that are mobile within the paging system. The pages include an address word and a message. The address word serves to route the page to the appropriate pager. The address word comprises a pager identifier portion and a compressed organization identifier portion. The pager identifier indicates the particular pager within an organization which is being paged. The compressed organization identifier is used by the pager to determine the organization from which the page originated.

The paging system periodically broadcasts to each pager an associative table. The associative table is a mapping between organization identifiers and compressed organization identifiers. In order to transmit a page, the paging terminal utilizes the compressed organization identifier associated with the organization identifier of the organization that is originating the page. Similarly, the receiving pager uses the associative table to convert the compressed organization identifier to the organization identifier. The pager can then determine whether or not the page is intended for that pager.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
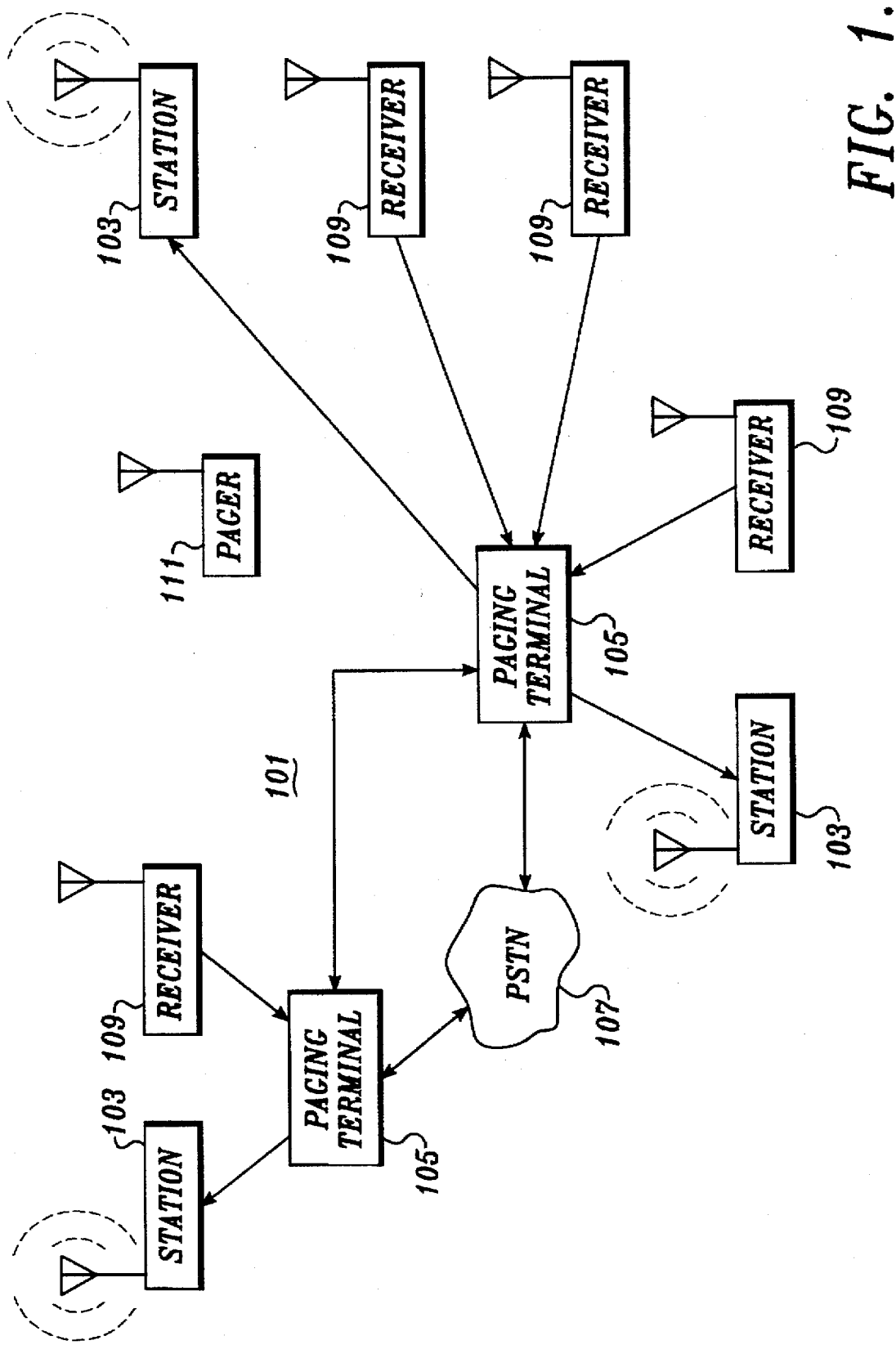
FIG. 1 is a schematic diagram of a typical paging system.

FIG. 1 shows a paging system 101 that includes paging stations 103, paging terminals 105, public switched telephone network (PSTN)107, paging receivers 109 and pager 111. It can be appreciated by those skilled in the art that while only two paging terminals 105 are shown, a paging system may include many paging terminals. Likewise, the number of other components of the paging system 101 are merely illustrative. Indeed, paging systems can be grown or shrunk to meet consumer demand.

The paging stations 103 are also referred to as base stations or paging transmitters. In operation, callers who wish to page a subscriber use the PSTN 107 to call the subscriber's pager telephone number. Alternatively, pages can be originated through a computer network directly connected to a paging terminal. The call is routed, perhaps through a plurality of paging terminals, from the PSTN 107 to paging terminal 105 which formulates a page. The page is distributed over a communications network to each of the paging stations 103. The paging stations 103 in turn transmit the page throughout the geographic coverage area of the paging system 101.

The pager 111 receives the page and processes the message embedded within the page for display to the subscriber. In the case of a one-way paging system, no further action is required. However, in the case of a two-way paging system, the pager 111 broadcasts back to paging receivers 109 an acknowledgment signal that informs the paging terminal 105 that the page has been successfully received. The pager 111 may also initiate other types of messages that are unsolicited and are not acknowledgments for received messages.

Figure 2:
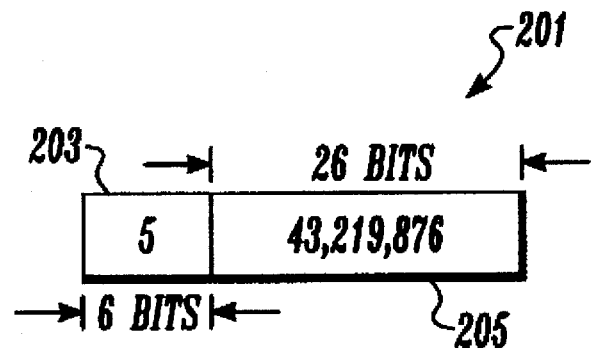
FIG. 2 illustrates the structure of an address word formed in accordance with the present invention.

It is the formulation of the page by the paging terminal 105 and the processing of the page by pager 111 that is the subject of the herein invention. In particular, a page formed in accordance with the present invention is comprised of at least two parts, an address word portion and a message portion. The address word 201 (shown in FIG. 2) identifies the pager 111 to which the page is intended. The message portion contains the actual message that is to be sent to the subscriber.

In accordance with the present invention, the address word 201 comprises two separate parts, a compressed organization identifier 203 and individual pager identifier 205. In the example illustrated in FIG. 2, the address word 201 is 32 bits in length. Of that, the compressed organization identifier 203 is 6 bits in length and the individual pager identifier 205 is 26 bits in length. With 26 bits, 67,108,864 different pagers may be addressed ($2^{26}$). This is adequate for most, if not all, paging service providers. Similarly, as will be seen below, with 6 bits in the compressed organization identifier 203, pages originated by up to 64 distinct organizations may be supported on the same radio channel.

The paging system 101 may include thousands of fixed location paging stations 103 that are connected to a paging terminal 105. For two-way paging, the receivers 109 may also be included in the network, many of which are at the same locations as the paging stations 103. Stored within each pager 111 in the paging system 101 is an individual pager identifier 205 that identifies the pager as a unique pager within the organization to which it belongs. Also stored within the memory of the pager 111 is a 10-bit organizational identifier 303 that identifies the organization to which the pager 111 belongs. In the example shown in FIG. 2, the compressed organizational identifier 203 is "5" and the organizational identifier 303 is "742".

Figure 3:
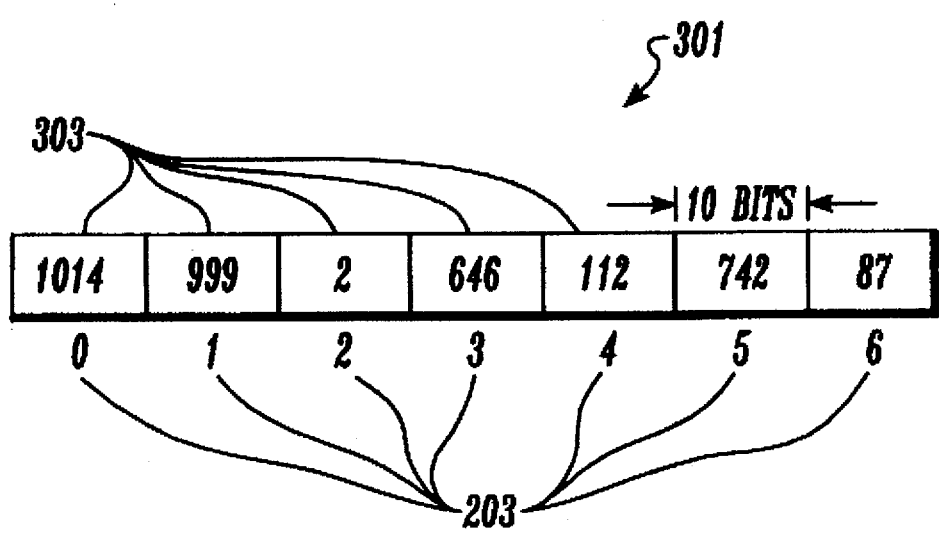
FIG. 3 illustrates an associative table that maps compressed organizational identifiers with organization identifiers.

The present invention operates by having each of the paging stations 103 periodically broadcast an associative table 301 (shown in FIG. 3) that associates organization identifiers 303 with compressed organization identifiers 203. As shown in FIG. 3, the compressed organizational identifier 203 is a 6-bit sequence, which may be the index of its associated full organizational identifier within the table. FIG. 3 shows only seven compressed organization identifiers 203, but it can be appreciated that a full associative table with a 6-bit compressed organization identifier may have up to 64 entries.

The organization identifier 303 is preassigned to each paging service provider (an "organization") and programmed into the pager 111 either at the time of manufacture or at the time a subscriber initiates service with an organization. The associative table 301 is transmitted by the paging system 101 to all of the pagers 111. The pagers 111 upon receiving the associative table 301 determine the index of their particular organizational identifier within the associative table and thus can identify their compressed organizational identifier. Thus, pager 111 will scan the associative table 301 for its organization identifier 303. Once it has been found, the corresponding matching compressed organization identifier 203 from the associative table 301 is determined and stored. The pager 111, as will be seen in greater detail below, uses the compressed organizational identifier 203 to read the address words 201 transmitted by the paging system 101.

Figure 4:
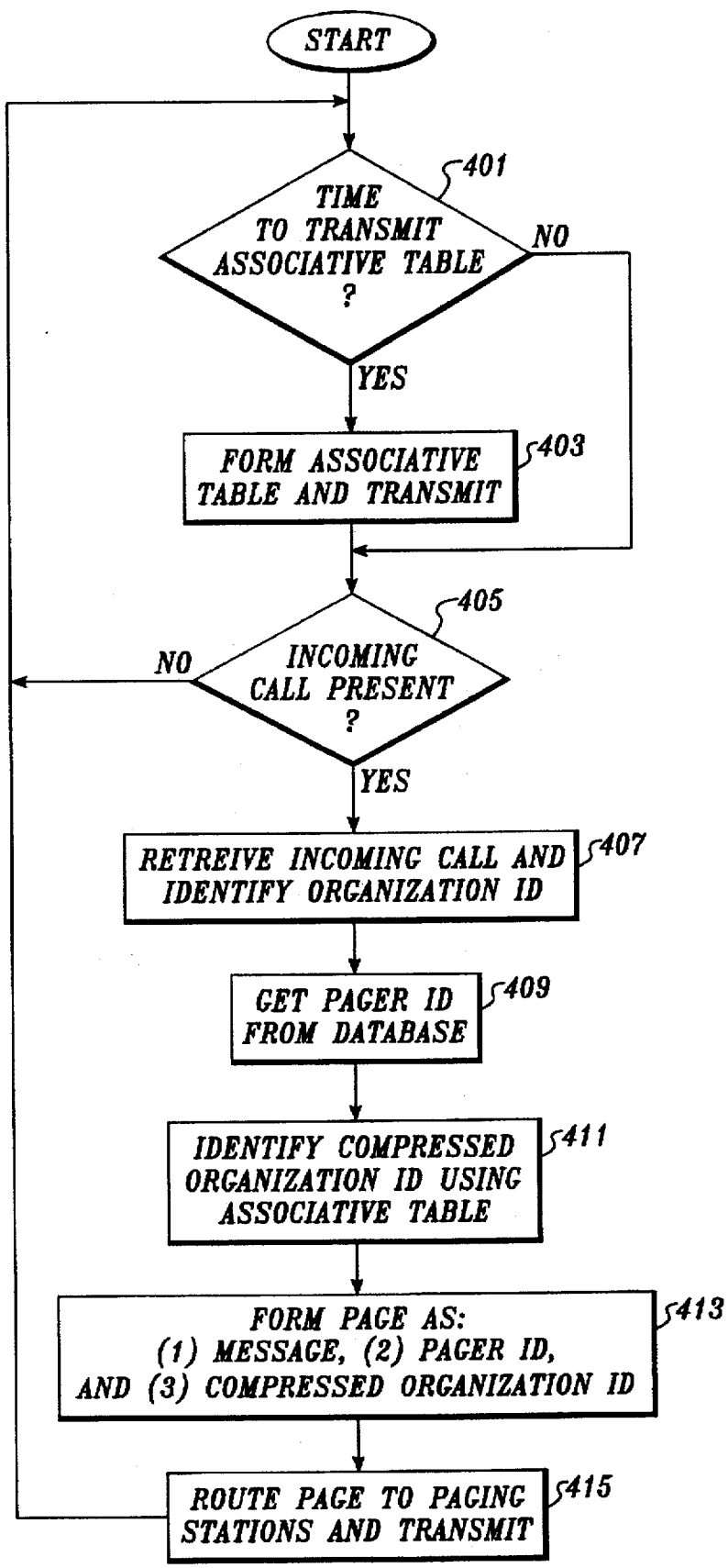
FIG. 4 is a flow diagram illustrating the process by which a paging system formulates a page.

The formulation of the associative table 301 by the paging terminal 105 is arbitrary. In particular, each of the separate organizations that are sharing the paging system 101 are simply assigned a compressed organization identifier 203. The association between the compressed organization identifier 203 and the organization identifier 303 forms the associative table 301. When the paging system adds or deletes a paging service provider as an organization, the associative table 301 is updated and transmitted to the pagers. It can be appreciated by those skilled in the art that although the example shows that the compressed organizational identifier 203 is implied by the location of organizational identifiers within the associative table 301, the compressed identifiers could have been explicitly included within the table without departing from the spirit and scope of the invention.

turning next to FIG. 4, the paging terminal 105 makes the periodic decision at box 401 to transmit the associative table 301 and proceeds at box 403 by formulating the associative table 301. The associative table 301 may simply be a digital representation of a table that associates the organization identifiers 303 with the compressed organization identifiers 203. The formation of such a table can be accomplished by any one of a number of known software methods. Associated with each number of the organizational identifiers 303 are compressed organizational identifiers 203.

After the associative table 301 is formulated, it is transmitted to all of the pagers 111 via the paging stations 103. As will be seen below, upon receipt of the associative table 301, the pagers 111 determine and store their compressed organizational identifier 203 for later use. Next, at box 405, an incoming call to a subscriber is recognized and processed by first determining which organization the incoming call is intended for. Thus, at box 407, the incoming call is analyzed and the organization identifier 303 is determined based either upon the called telephone number or, alternatively, simply because all pagers controlled by the particular paging terminal 105 have the same organizational identifier 303. For example, as shown in FIG. 3, the incoming call is determined to belong of the organization having an organization identifier 303 (in the case of FIG. 2 "742"), i.e., one of the 1,024 possible identifiers.

Next, at box 409, the unique pager identifier 205 for the pager being called is extracted from the database of the paging terminal 105. This step may be accomplished using known techniques in use currently. Next, at box 411, the compressed organization identifier 203 that is associated with the organization identifier 303 identified in box 407 is determined. This is accomplished using the associative table 301 to map the example organizational identifier 303 "742" to the compressed organizational identifier 203 "5".

Next, at box 413, the page is formulated by adding the message with the address word 201. The address word 201 will include the pager identifier 205 of box 409 and the compressed organization identifier 203 of box 411. Finally, at box 415, the page is routed to the paging stations 103 and the paging stations 103 transmit the page to the pager 111.

Figure 5:
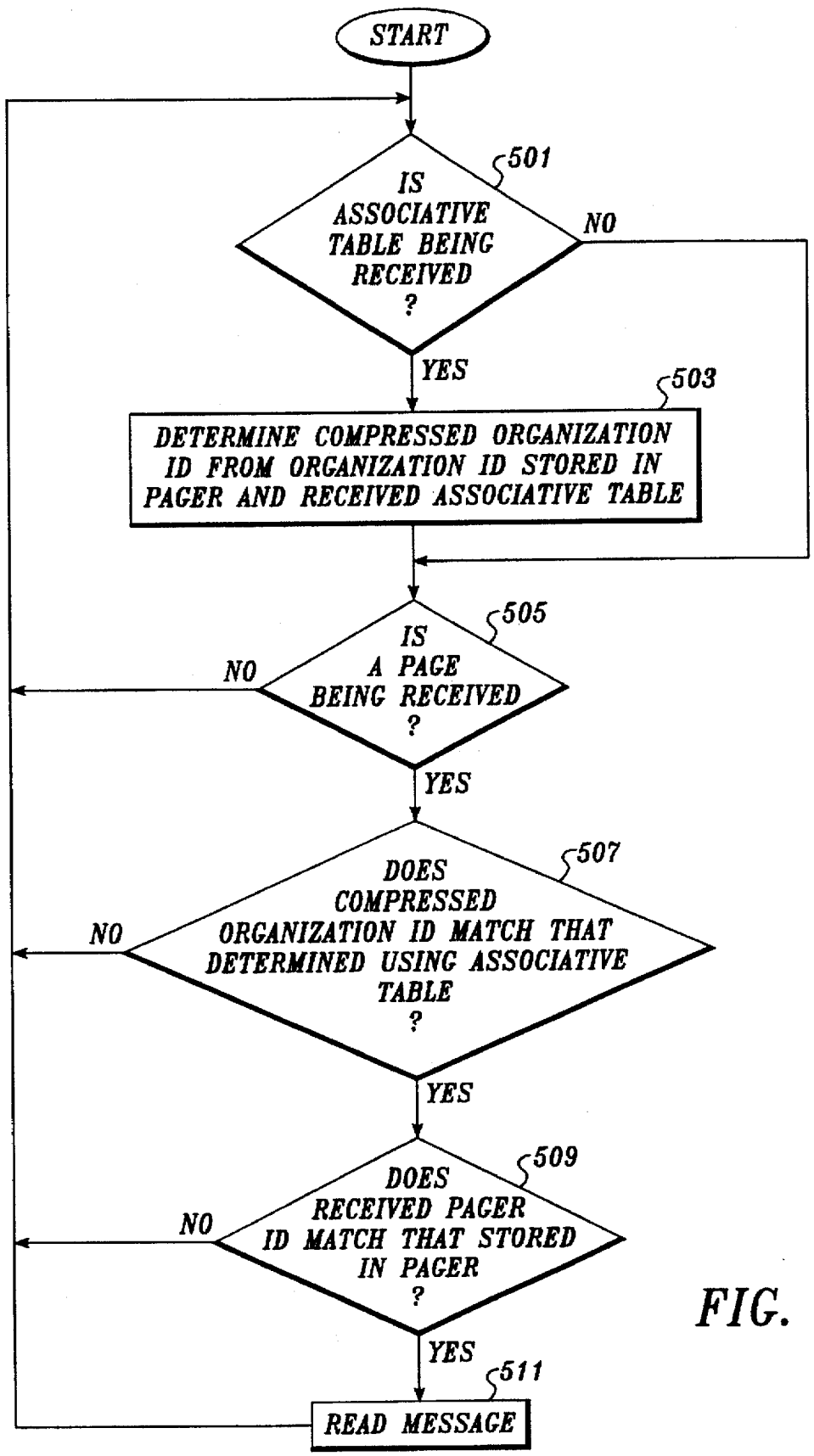
FIG. 5 is a flow diagram illustrating the method by which a pager receives a page.

On the pager side, the pager 111 must process each page that it receives to determine whether or not that page is intended for that particular pager 111. In order to accomplish this, pager 111 examines the address word 201 of each page that is broadcast by the paging system 101. Turning to FIG. 5, first, at box 501, the pager determines if the paging system 101 is transmitting the associative table 301 and, if so, proceeds at box 503 to determine and store the compressed organizational identifier 203 for the organization to which the pager 111 belongs.

Then, at box 505, the pager determines if a page is being transmitted by the paging system 101 and, if so, determines at box 507 whether the compressed organizational identifier 203 within the address word 201 of the page matches the compressed organizational identifier 203 dictated in box 503. If so, proceeding to box 509, the pager determines if the individual pager identifier 205 within the address word 201 of the pager matches the pager identifier stored within the pager. If so, the message is read at box 511. If the answer to any of the determinations in boxes 505-511 is negative, then control returns to box 501.

For two-way pagers, the same process is also used by the pager 111 to formulate acknowledgment or unsolicited signals. In particular, the pager will use the compressed organization identifier 203 (obtained from the associative table 301) for the particular organization identifier 303 to which it belongs. Its unique pager identifier 205 will be concatenated to the compressed organizational identifier 203 and the address word 201 is formed. In addition, a responding message may also be added to form the transmitted signal. Alternatively, in another embodiment, the address word 201 is simply copied from the received page in order to acknowledge it.

The paging receivers 109 upon receipt of a signal from a pager 111 will determine the organization identifier 303 of the pager from the compressed organization identifier 203 and by using the associative table 301. Upon determining the organization identifier 303, the paging system 101 will route the received signal to the appropriate paging terminal 105 or other correct processing center or switch.

It can be appreciated by those skilled in the art that although a 6-bit compressed organization identifier, a 10-bit organizational identifier, and a 26-bit pager identifier are used as an example herein, the lengths may be varied and various changes made without departing from the spirit and scope of the invention. In addition, the use of multiple pager identifiers or organizational identifiers by a single pager is not precluded. Paging terminals may also support a single or multiple organizational identifiers. When this invention is used for very large systems, it can be appreciated that perhaps the organizations may share the paging infrastructure in some geographic areas and not in others. Therefore, different associative tables may be broadcast in different geographic areas covered by the paging system.

The embodiments of the invention in which an exclusive property or privilege is claimed are defined as follows:

1. A method for addressing a plurality of pagers in a paging system, each of said plurality of pagers belonging to at least one of a plurality of organizations, each of said plurality of organizations having assigned thereto an organization identifier, the paging system including a plurality of paging stations, said plurality of organizations sharing said plurality of paging stations, the method comprising the steps of:

(a) forming an associative table having a one to one correspondence between each said organization identifier for said plurality of organizations and a plurality of compressed organization identifiers; and (b) formulating an address word for a page to a paged pager as the compressed organization identifier associated with the organization identifier of the paged pager and a pager identifier for the paged pager.

2. The method of claim 1, wherein said paging system further includes a plurality of paging receivers, the method further including the step of having the paged pager formulate an acknowledgment signal by duplicating the address word of the page and attaching a responding message to the address word of the page and transmitting to one of said paging receivers.

3. The method of claim 1 further including the step of providing to said plurality of pagers an indication as to their particular compressed organization identifier.

4. The method of claim 3, wherein said paging system further includes a plurality of paging receivers, the method further including the step of having the paged pager formulate an acknowledgment signal by duplicating the address word of the page and attaching a responding message to the address word of the page and transmitting to one of said paging receivers.

5. The method of claim 3 further wherein said step of providing said plurality of pagers with their compressed organization identifier is accomplished by transmitting to said pagers said associative table.

6. The method of claim 5, wherein said paging system further includes a plurality of paging receivers, the method further including the step of having the paged pager formulate an acknowledgment signal by duplicating the address word of the page and attaching a responding message to the address word of the page and transmitting to one of said paging receivers.

7. The method of claim 5 further including the step of periodically updating the associative table in said pagers by transmitting a new associative table to each of said pagers over said paging system.

8. A paging system shared by a plurality of organizations, each of said plurality of organizations having assigned thereto an organization identifier, said paging system comprising:

(a) at least one paging terminal, said paging terminal operative to formulate an associative table having a one to one correspondence between each said organization identifier for said plurality of organizations and a plurality of compressed organization identifiers, said paging terminal also operative to formulate a page to a paged pager and forwarding said page to said plurality of paging stations; and (b) a plurality of paging stations in communicative connection to said paging terminal and when said page is received from said paging terminal, for broadcasting said page to said paged pager;

wherein said paging terminal formulates said page by adding to a message an address word, the address word including the compressed organization identifier associated with the organization identifier for the page and a pager identifier for the paged pager.

9. The paging system of claim 8 further including a plurality of pagers, said plurality of pagers belonging to one of said plurality of organizations and said plurality of pagers including in memory said associative table.

10. The paging system of claim 8, further including a plurality of paging receivers, said paging receivers in communicative connection with said at least one paging terminal, said paging receivers operative to receive an acknowledgment signal from said paged pager, wherein said paged pager upon receipt of said page formulates an acknowledgment signal by duplicating the address word of the page and attaching a responding message to the address word of the page and transmitting to one of said paging receivers, and further wherein said paging receiver relays said acknowledgment signal to said at least one paging terminal.

11. The paging system of claim 10 further including a plurality of pagers, said plurality of pagers belonging to one of said plurality of organizations and said plurality of pagers including in memory said associative table.

12. A method for receiving a page from a paging system by a pager, said paging system being shared by a plurality of organizations, each of said plurality of organizations having assigned thereto an organization identifier, said pager having stored in memory a pager identifier and an organization identifier, said page including a compressed organization identifier, a pager identifier, and a message, the method comprising the steps of:

(a) generating within said pager a compressed organization identifier corresponding to said organization identifier based upon data received from said paging system;

(b) extracting from said page said compressed organization identifier;

(c) determining whether said compressed organization identifier from said page matches said compressed organization identifier stored in said pager;

(d) determining if said pager identifier of said page matches said pager identifier stored in said pager;

(e) reading said message only if the compressed organization identifier of said page matches said pager generated compressed organization identifier and said pager identifier of said page matches said pager idenifier stored in said pager.

13. The method of claim 12 further including the step of receiving an updated associative table from said paging system periodically.

14. A paging system for being shared among a plurality of organizations, each of said organizations having assigned thereto an organization identifier, said paging system operative to send a page to a pager, said paging system comprising:

(a) a paging terminal operative to assign a compressed organization identifier to each of said organization identifiers and for formulating said page by determining the compressed organization identifier of said paged pager and the paging identifier of said paged pager;

(b) a plurality of pagers, each pager belonging to at least one of said organizations; and (c) a plurality of paging stations capable of transmitting said page to said pagers.

* * * * *